United States Patent
Huang et al.

(10) Patent No.: US 12,412,076 B1
(45) Date of Patent: Sep. 9, 2025

(54) TRAFFIC ANOMALY DETECTION METHOD AND SYSTEM BASED ON IMPROVED BERT INTEGRATING CONTRASTIVE LEARNING

(71) Applicant: JINAN UNIVERSITY, Guangzhou (CN)

(72) Inventors: Feiran Huang, Guangzhou (CN); Jinming Zhong, Guangzhou (CN); Zhibo Zhou, Guangzhou (CN); Jian Weng, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 0 days.

(21) Appl. No.: 18/961,535

(22) Filed: Nov. 27, 2024

(30) Foreign Application Priority Data

Mar. 7, 2024 (CN) .......................... 202410258967.3

(51) Int. Cl.
 *G06N 3/045* (2023.01)
 *G06N 3/084* (2023.01)
 *G06N 3/088* (2023.01)

(52) U.S. Cl.
 CPC ............. *G06N 3/045* (2023.01); *G06N 3/084* (2013.01); *G06N 3/088* (2013.01)

(58) Field of Classification Search
 CPC ......... G06N 3/045; G06N 3/084; G06N 3/088
 See application file for complete search history.

(56) References Cited

U.S. PATENT DOCUMENTS

| | | | |
|---|---|---|---|
| 11,843,624 B1 | 12/2023 | Estep | |
| 2019/0102678 A1* | 4/2019 | Chang | G06F 18/2415 |

(Continued)

FOREIGN PATENT DOCUMENTS

| | | |
|---|---|---|
| CN | 114781392 A | 7/2022 |
| CN | 114861601 B | 8/2022 |

(Continued)

OTHER PUBLICATIONS

Hang, Zijun, et al. "Flow-MAE: Leveraging Masked AutoEncoder for Accurate, Efficient and Robust Malicious Traffic Classification." Proceedings of the 26th International Symposium on Research in Attacks, Intrusions and Defenses. 2023. (Year: 2023).*

(Continued)

*Primary Examiner* — Miranda M Huang
*Assistant Examiner* — Sidney Vincent Bostwick
(74) *Attorney, Agent, or Firm* — Jeenam Park

(57) ABSTRACT

A traffic anomaly detection method and system based on improved BERT integrating contrastive learning is provided, the method includes: obtaining traffic data and preprocessing the data; building an improved BERT model including an embedding layer and 12 Transformer encoder networks; performing weight sharing operation among a first 6 Transformer encoder networks and a last 6 Transformer encoder networks, respectively; building a classification network; building a total loss function based on a cross-entropy loss and a contrastive loss; performing unsupervised pre-training on the improved Bidirectional Encoder Representations from Transformers, BERT model; fine-tune training the improved BERT model; updating model parameters through backpropagation to obtain a trained improved BERT model; feed test traffic data into the trained improved BERT model; and obtain a traffic detection outcome. The present disclosure enhances the generalization ability of the model while maintaining stability and accuracy.

4 Claims, 5 Drawing Sheets

(56) References Cited

U.S. PATENT DOCUMENTS

2022/0129621 A1     4/2022    Guda
2024/0273374 A1*   8/2024    Lee ..................... G06N 3/045

FOREIGN PATENT DOCUMENTS

| CN | 116257698 A | 6/2023 |
| CN | 116541838 A | 8/2023 |
| CN | 116595407 A | 8/2023 |
| CN | 116910341 A | 10/2023 |
| CN | 117082004 A | 11/2023 |
| WO | 2024000944 A1 | 1/2024 |

OTHER PUBLICATIONS

He, Ju, et al. "Transfg: A transformer architecture for fine-grained recognition." Proceedings of the AAAI conference on artificial intelligence. vol. 36. No. 1. 2022. (Year: 2022).*

He Shasha "Research on Encrypted Traffic Classification Based on CNN-Transformer and Mutal Contrastive Learning" CMFD, Information Technology, Sep. 15, 2023 (Sep. 15, 2023), pp. | 139-89.

Zijun Hang "Flow-MAE: Leveraging Masked AutoEncoder for Accurate, Efficient and Robust Malicious Traffic Classification" RAID '23: Proceedings of the 26th International Symposium on Research in Attacks, Oct. 16, 2023 (Oct. 16, 2023), pp. 297-314.

* cited by examiner

TRAFFIC ANOMALY DETECTION METHOD AND SYSTEM BASED ON IMPROVED BERT INTEGRATING CONTRASTIVE LEARNING

CROSS-REFERENCE TO RELATED APPLICATIONS

This application claims priority to Chinese Patent Application No. 202410258967.3, filed on Mar. 7, 2024, which is hereby incorporated by reference in its entirety.

TECHNICAL FIELD

The present disclosure relates to the field of device traffic detection technology and, more particularly, to a traffic anomaly detection method and system based on improved Bidirectional Encoder Representations from Transformers (BERT) integrating contrastive learning.

BACKGROUND

Internet of Things (IoT) technologies are embraced widely, creating living and occupational environs with more intelligence, efficiency and ease. However, the proliferation of IoT technologies come at the price of daunting network security challenges. IoT devices, with their typically slender processing and memory resources, often struggle to accommodate conventional defense measures such as antivirus software and firewalls. A hijacked IoT device is not only diminished in its functionalities, but may also become the attacker's springboard for breaching other devices. Therefore, traffic anomaly detection technologies capable of timely detecting malicious activities in the network and enhancing security administrative capabilities are now our imperative needs. Traditional deep learning-based anomaly traffic detection methods mainly included CNN-based methods and RNN-based methods, but both are not without deficiencies. Network traffic data usually have intricate spatial and temporal dynamics, yet the CNN-based methods are hard-pressed to mine the global time sequence features of the traffic data. In contrast, the RNN-based methods, which do hold the key to unlocking these features, inherently resist parallelism. In recent years, BERT-based methods have been proven to unravel long-range interdependencies in traffic data with exceptional detection efficacy, yet their appetite for more computing resources and memory is preventing their utilization on less resourceful platforms.

SUMMARY

To overcome the defects and shortcomings in the existing art, the present disclosure provides a traffic anomaly detection method and a system based on improved Bidirectional Encoder Representations from Transformers (BERT) integrating contrastive learning. The present disclosure modifies the BERT model by leveraging weight sharing, hence addressing the issue of excessive resource consumption when applying the BERT model, and effectively enhancing the model's generalization capability while maintaining stable accuracy.

To achieve the aforementioned objectives, the present disclosure adopts the following technical solutions.

The present disclosure provides a traffic anomaly detection method based on improved BERT integrating contrastive learning, including the following steps:

obtaining traffic data and preprocessing the traffic data to obtain a byte sequence;

building an improved BERT model including an embedding layer and 12 Transformer encoder networks, where the byte sequence is fed into the embedding layer, and is taken to be a text segment, and a byte is taken to be a word; extracting a token embedding, a segment embedding and a position embedding as representations for the word; summing up the token embedding, the segment embedding and the position embedding to obtain a corresponding vector; performing weight sharing operation among a first 6 Transformer encoder networks and a last 6 Transformer encoder networks, respectively; and outputting, by the improved BERT model and for the byte, a vector representation including traffic contextual feature information;

building a classification network;

building a total loss function based on a cross-entropy loss and a contrastive loss;

applying masking to the byte sequence and feeding a masked byte sequence into the improved BERT model for unsupervised pre-training; calculating a probability distribution of a byte at a masked position using forward computation; and calculating a difference between a predicted probability distribution and a real label based on the cross-entropy loss function;

passing an output vector from a 12th layer Transformer encoder network of the improved BERT model to the classification network; outputting, by the classification network, a probability distribution corresponding to a number of class labels; and calculating the contrastive loss using an output vector of a 10th layer Transformer encoder network of the improved BERT model;

updating a model parameter through backpropagation to obtain a trained improved BERT model;

obtaining test traffic data; feeding the test traffic data into the trained improved BERT model; and obtaining a traffic detection outcome.

In some embodiments of the present disclosure, the preprocessing the traffic data includes data splitting, vocabulary expanding, data cleaning, and unifying data length, where the data splitting includes splitting an original traffic data set into data stream sets using a network session as a splitting criterion, where a data stream is a sequence of multiple data packets, where a data packet in the data stream includes a five-tuple: {source IP, destination IP, source port, destination port, network protocol}, and is arranged according to a temporal order, and the data packet is a sequence of multiple bytes, the vocabulary expanding includes adding new words to a BERT vocabulary, the data cleaning includes removing information that does not meet a specified condition, and the unifying data length includes a step of unifying data stream length and a step of unifying data packet length.

In some embodiments of the present disclosure, the classification network includes several fully connected layers and a softmax layer, the vector representation outputted from the improved BERT model is fed into the classification network and through the several fully connected layers to generate a numerical distribution list for traffic classification, the softmax layer performs softmax calculation on the numerical distribution list to convert the list into a probability distribution for traffic classification.

In some embodiment of the present disclosure, the building a total loss function based on a cross-entropy loss and a contrastive loss may be specifically denoted as:

$$Loss = \lambda \cdot CELoss + (1 - \lambda) \cdot SCLoss$$

$$CELoss = \sum_{(y,t)} -[(t \log y) + (1 - t)\log(1 - y)]$$

$$SCLoss = \sum_{i \neq j} -y \cdot \log(\sigma(S(x_i, x_j)/\tau)) - (1 - y) \cdot \log(1 - \sigma(S(x_i, x_j)/\tau))$$

where the CELoss denotes the cross-entropy loss, the SCLoss denotes contrastive loss, the $\lambda$ is used to control weights between the cross-entropy loss and the contrastive loss, the t denotes a real label of a network stream, the y denotes a probability result calculated by the softmax layer, the $\sigma$ denotes a sigmoid function, the i and the j denote different network traffic samples from the same batch, the $x_i$ and $x_j$ respectively denote the [CLS] vectors output by the 10th layer encoder of the improved BERT model, the S denotes a function for measuring a similarity between the $x_i$ and $x_j$, the y indicates whether the $x_i$ and $x_j$ belong to the same class, and $\tau$ is a hyperparameter.

In some embodiments of the present disclosure, following the trained improved BERT model is obtained, the method further includes: assessing a performance of the BERT model according to accuracy, recall, precision, and F1 score, denoted by:

$$Accuracy = \frac{TP + TN}{TP + TN + FP + FN}$$

$$Recall = \frac{TP}{TP + FN}$$

$$Precision = \frac{TP}{TP + FP}$$

$$F1\_score = \frac{2 \times Precison \times Recall}{Precison + Recall}$$

where the Accuracy denotes the accuracy, the Recall denotes the recall, the Precision denotes the precision, the F1_score denotes the F1 score, the TP indicates the BERT model has correctly predicted an actual anomaly traffic to be anomalous, the TN indicates the BERT model has correctly predicted an actual normal traffic to be normal, the FP indicates the BERT model has erroneously predicted an actual normal traffic to be anomalous, the FN indicates the BERT model has erroneously predicted an actual anomaly traffic to be normal.

The present disclosure also provides a traffic anomaly detection system based on improved BERT integrating contrastive learning, including: a traffic data acquisition module, a data preprocessing module, an improved BERT model building module, a classification network building module, a total loss function building module, an unsupervised pre-training module, a fine-tune training module, and a traffic detection outcomes outputting module, where:
the traffic data acquisition module is used to acquire traffic data;
the data preprocessing module is used to preprocess the traffic data to obtain a byte sequence;
the improved BERT model building module is used to: build an improved BERT model including an embedding layer and 12 Transformer encoder networks, where the embedding layer takes the byte sequence to be a text segment, and a byte to be a word; extracting a token embedding, a segment embedding and a position embedding as representations for the word; sum up the token embedding, the segment embedding and the position embedding to obtain a corresponding vector; perform weight sharing operation among a first 6 Transformer encoder networks and a last 6 Transformer encoder networks, respectively; and the improved BERT model outputs, for the byte, a vector representation including traffic contextual feature information;
the classification network building module is used to build a classification network;
the total loss function building module is used to build a total loss function based on a cross-entropy loss and a contrastive loss;
the unsupervised pre-training module is used to: apply masking to the byte sequence and feed a masked byte sequence into the improved BERT model for unsupervised pre-training; calculate a probability distribution of a byte at a masked position using forward computation; and calculate a difference between a predicted probability distribution and a real label based on the cross-entropy loss function;
the fine-tune training module is used to: transfer an output vector from a 12th layer Transformer encoder network of the improved BERT model to the classification network; the classification network outputs a probability distribution corresponding to a number of class labels; and calculates the contrastive loss using an output vector of a 10th layer Transformer encoder network of the improved BERT model; and
updates a model parameter through backpropagation to obtain a trained improved BERT model;
the traffic detection outcome outputting module is used to: feed test traffic data into the trained improved BERT model; and obtain a traffic detection outcome.

In some embodiment of the present disclosure, when the data preprocessing module is used to preprocess the traffic data to obtain a byte sequence, the data preprocessing module is more specifically used to perform: data splitting, vocabulary expanding, data cleaning, and unifying data length, where:
the data splitting includes splitting an original traffic data set into data stream sets using a network session as a splitting criterion, where a data stream is a sequence of multiple data packets, where a data packet in the data stream includes a five-tuple: {source IP, destination IP, source port, destination port, network protocol}, and is arranged according to a temporal order, and the data packet is a sequence of multiple bytes,
the vocabulary expanding includes adding new words to a BERT vocabulary,
the data cleaning includes removing information that does not meet a specified condition, and
the unifying data length includes a step of unifying data stream length and a step of unifying data packet length.

In some embodiments of the present disclosure, the classification network includes several fully connected layers and a softmax layer,
the several fully connected layers convert the vector representation outputted from the improved BERT model into a numerical distribution list for traffic classification, and the softmax layer performs softmax calculation on the numerical distribution list to convert the list into a probability distribution for traffic classification.

In some embodiments of the present disclosure, the total loss function building module is used to build a total loss function based on a cross-entropy loss and a contrastive loss, where the total loss function is denoted as:

$$Loss = \lambda \cdot CELoss + (1 - \lambda) \cdot SCLoss$$

$$CELoss = \sum_{(y,t)} -[(t \log y) + (1-t)\log(1-y)]$$

$$SCLoss = \sum_{i \neq j} -y \cdot \log(\sigma(S(x_i, x_j)/\tau)) - (1-y) \cdot \log(1 - \sigma(S(x_i, x_j)/\tau))$$

where the CELoss denotes the cross-entropy loss, the SCLoss denotes contrastive loss, the $\lambda$ is used to control weights between the cross-entropy loss and the contrastive loss, the t denotes a real label of a network stream, the y denotes a probability result calculated by the softmax layer, the $\sigma$ denotes a sigmoid function, the i and the j denote different network traffic samples from the same batch, the $x_i$ and $x_j$ respectively denote the [CLS] vectors output by the 10th layer encoder of the improved BERT model, the S denotes a function for measuring a similarity between the $x_i$ and $x_j$, the y indicates whether the $x_i$ and $x_j$ belong to the same class, and $\tau$ is a hyperparameter.

In some embodiments of the present disclosure, the system further includes a model assessing module used to assess a performance of the BERT model according to accuracy, recall, precision, and F1 score, denoted by:

$$Accuracy = \frac{TP + TN}{TP + TN + FP + FN}$$

$$Recall = \frac{TP}{TP + FN}$$

$$Precision = \frac{TP}{TP + FP}$$

$$F1\_score = \frac{2 \times Precision \times Recall}{Precision + Recall}$$

where the Accuracy denotes the accuracy, the Recall denotes the recall, the Precision denotes the precision, the F1_score denotes the F1 score, the TP indicates the BERT model has correctly predicted an actual anomaly traffic to be anomalous, the TN indicates the BERT model has correctly predicted an actual normal traffic to be normal, the FP indicates the BERT model has erroneously predicted an actual normal traffic to be anomalous, the FN indicates the BERT model has erroneously predicted an actual anomaly traffic to be normal.

Compared with the existing art, the present disclosure has the following advantages and desirable effects:

(1) the present disclosure modifies the BERT model by leveraging weight sharing, hence addressing the issue of excessive resource consumption in using the BERT model, effectively enhancing the model's generalization capability while maintaining stable accuracy;

(2) the present disclosure integrates the contrastive learning paradigm, significantly improving the robustness and accuracy in view of a common problem of reduced robustness in existing models due to the diversity in combinations of byte codes.

DESCRIPTION OF EMBODIMENTS

To make the objectives, technical solutions, and advantages of the present disclosure clearer, the present disclosure will be explained in more detail in the following in conjunction with the accompanying drawings and embodiments. It should be understood that the specific embodiments described herein merely serve to explain, rather than limit, the present disclosure.

Embodiment 1

Figure 1:
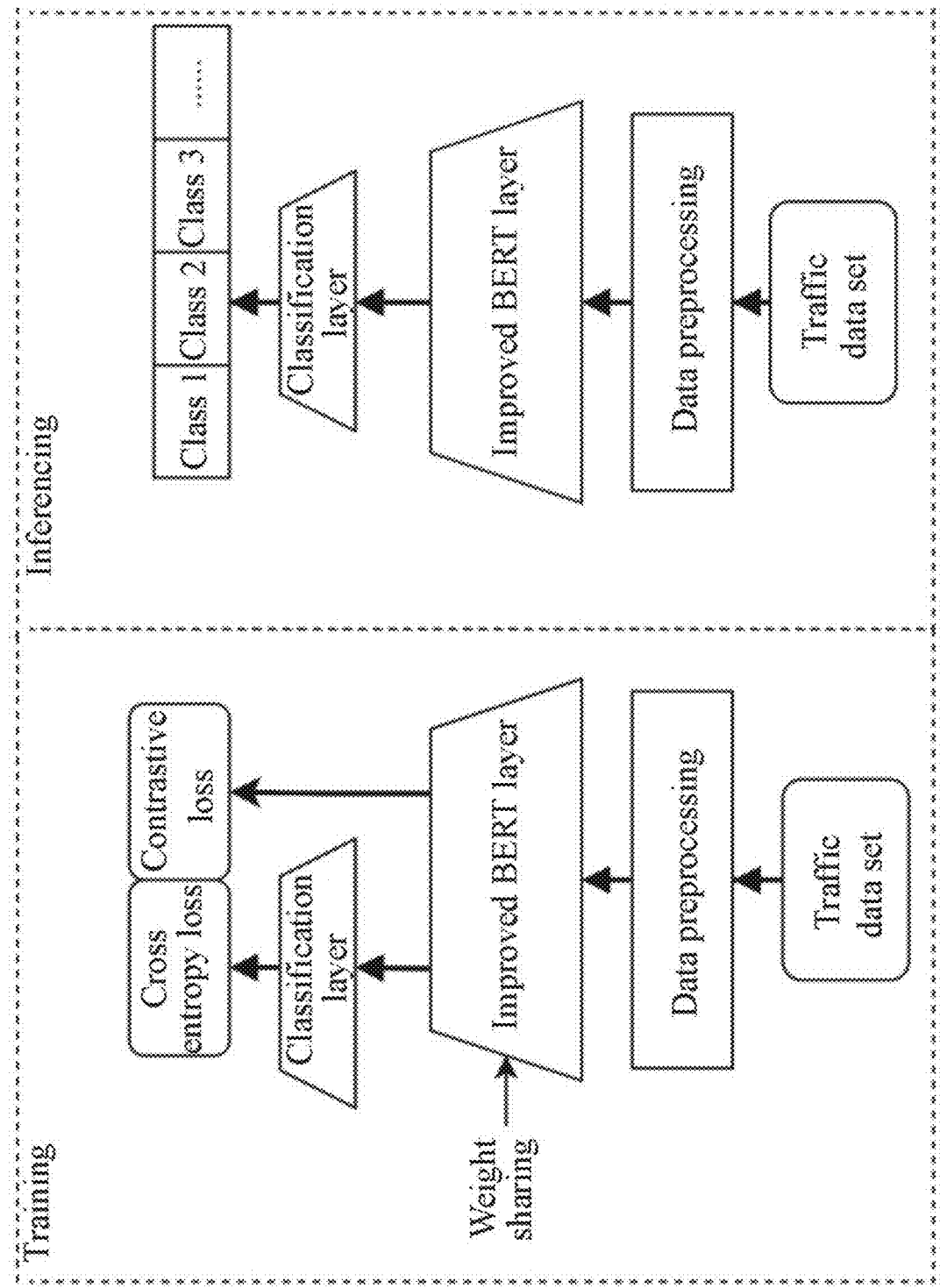
FIG. 1 is a flowchart of a traffic anomaly detection method based on improved BERT and integrating contrastive learning according to the present disclosure.

As illustrated in FIG. 1, this embodiment provides a traffic anomaly detection method based on improved BERT integrating contrastive learning, including the following steps.

S1: Data preprocessing: this step processes the traffic data by formatting the data according to that is required for feeding into the model. The main steps include data splitting, vocabulary expanding, data cleaning, and unifying data length. The unifying data length includes unifying data stream length and unifying data packet length.

Figure 2:
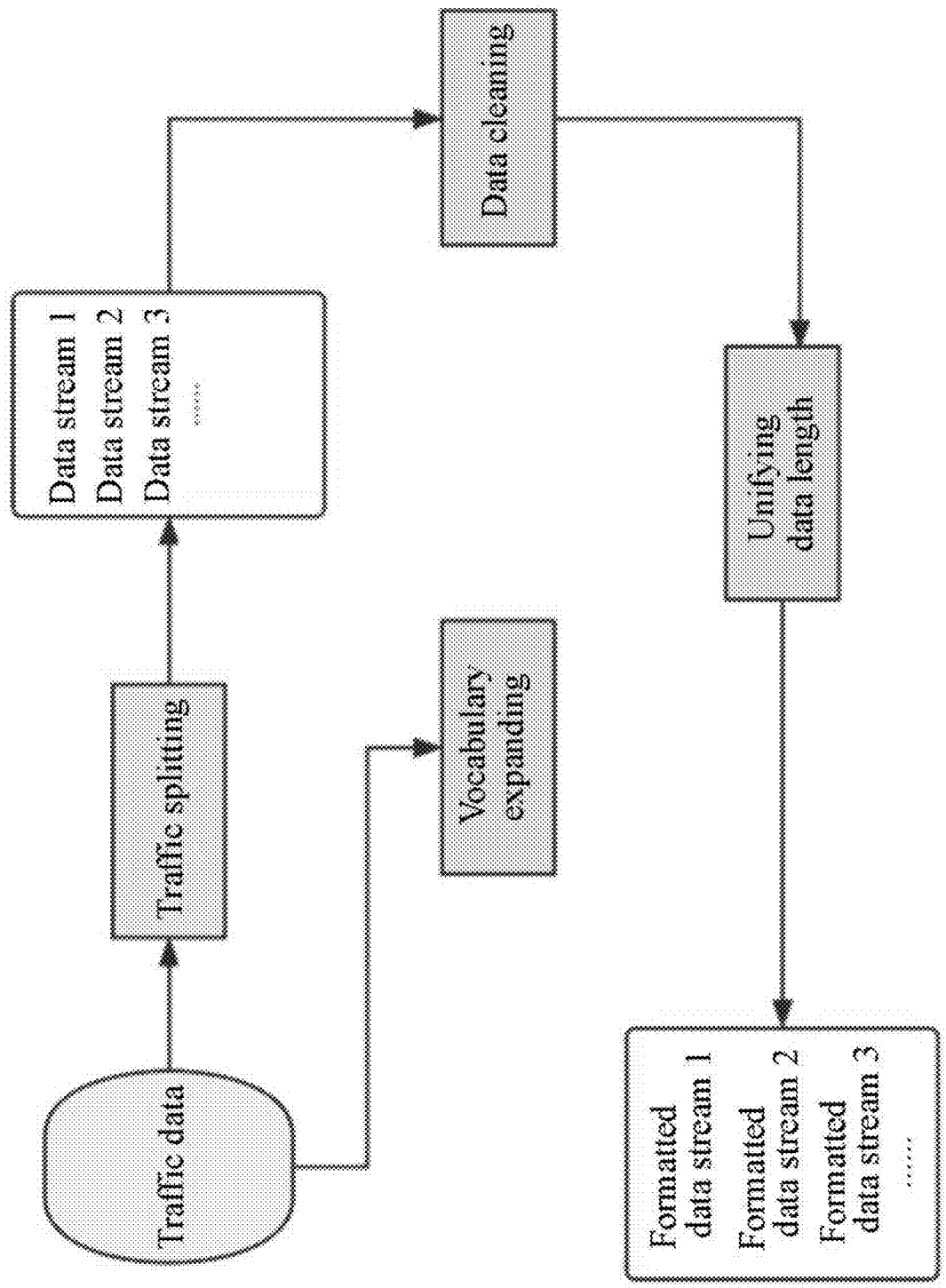
FIG. 2 is a flowchart of data preprocessing according to the present disclosure.
Figure 3:
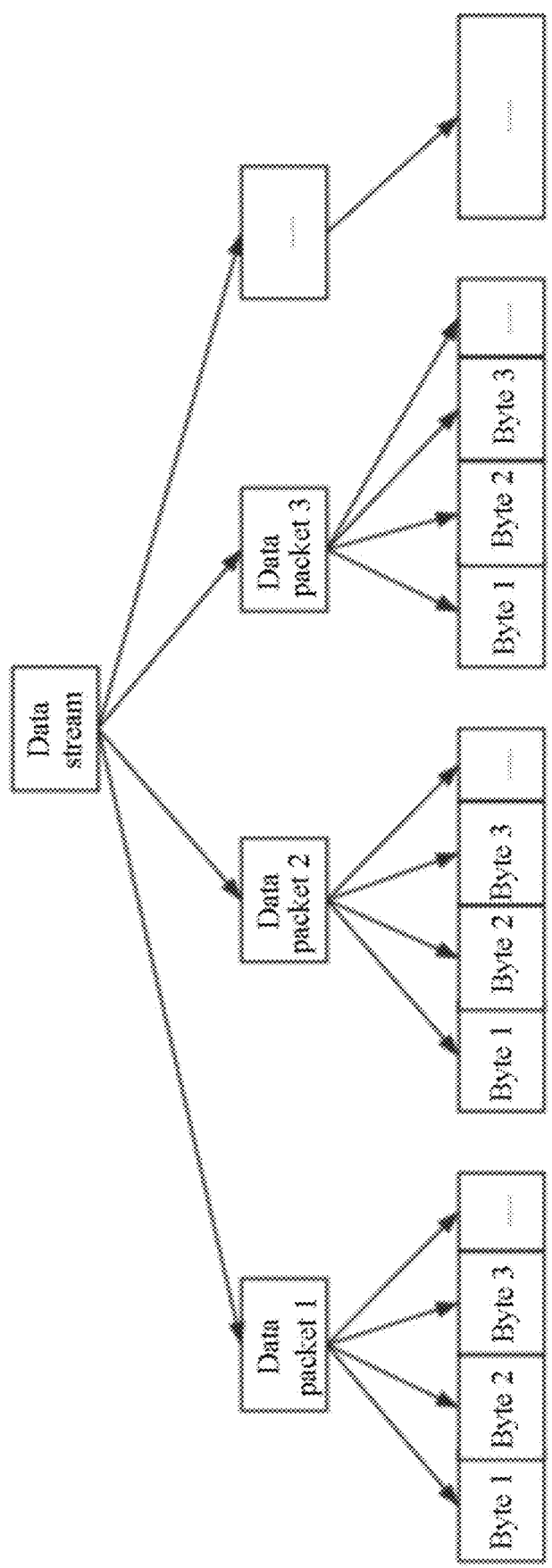
FIG. 3 is a schematic diagram of data stream hierarchy according to the present disclosure.

As shown in FIG. 2, the data preprocessing at step S1 includes the specific steps of:

S11: Data splitting:

Using a network session as a splitting criterion, a data set is split into data stream sets S={data stream$_1$, data stream$_2$, data stream$_3$, . . . }, where any data stream i is a sequence of multiple data packets, denoted data stream i={data packet$_1$, data packet$_2$, data packet$_3$, . . . }, with individual data packets in the data stream including a five-tuple: {source IP, destination IP, source port, destination port, network protocol}, and being arranged according to a temporal order, and the data packet is a sequence of multiple bytes, denoted data packet j={byte$_1$, byte$_2$, byte$_3$, . . . }, where all bytes are stored in the form of texts in hexadecimal representation.

S12: Vocabulary expanding:

Add new words to a BERT vocabulary, which are in the form of a string of all possible hexadecimal representations of a single byte, for example: '0x00', '0x01', . . . , '0xfe', '0xff'.

S13: Data cleaning:

Remove extraneous information for the training, such as a data packet with only IP header information but no payload; and replace bytes containing the IP address and MAC addresses of a data packet with special characters.

S14: Unifying data stream length:

Since subsequent model training requires a unified input format, set N to be a threshold for the data stream length (i.e., a number of data packets), and set K to be a threshold for the data packet length (i.e., a number of bytes). truncate a data stream longer than N down to N; when a data stream has less than N data packets, use data packets consisting of special characters and having a length of K to pad the data stream up to N data packets. Since the BERT model requires an input length of 512, the product of N and K must be less than 512.

S15: Unifying data packet length:

Similar to step S14, truncate a data packet longer than K bytes down to K bytes; and use special characters to pad a data packet having less than K bytes up to K bytes.

S2: Build an improved BERT model: The improved BERT model includes an embedding layer and 12 Transformer encoder networks. The input is the preprocessed byte sequence from step S1, and the output is a vector representation sequence corresponding to the byte sequence. Weight sharing operation is performed among a first 6 Transformer encoder networks and a last 6 Transformer encoder networks, respectively, so as to prune the parameters while enhancing the model's generalization capability.

In this embodiment, the BERT layer network includes an embedding layer and the BERT encoder network.

Figure 4:
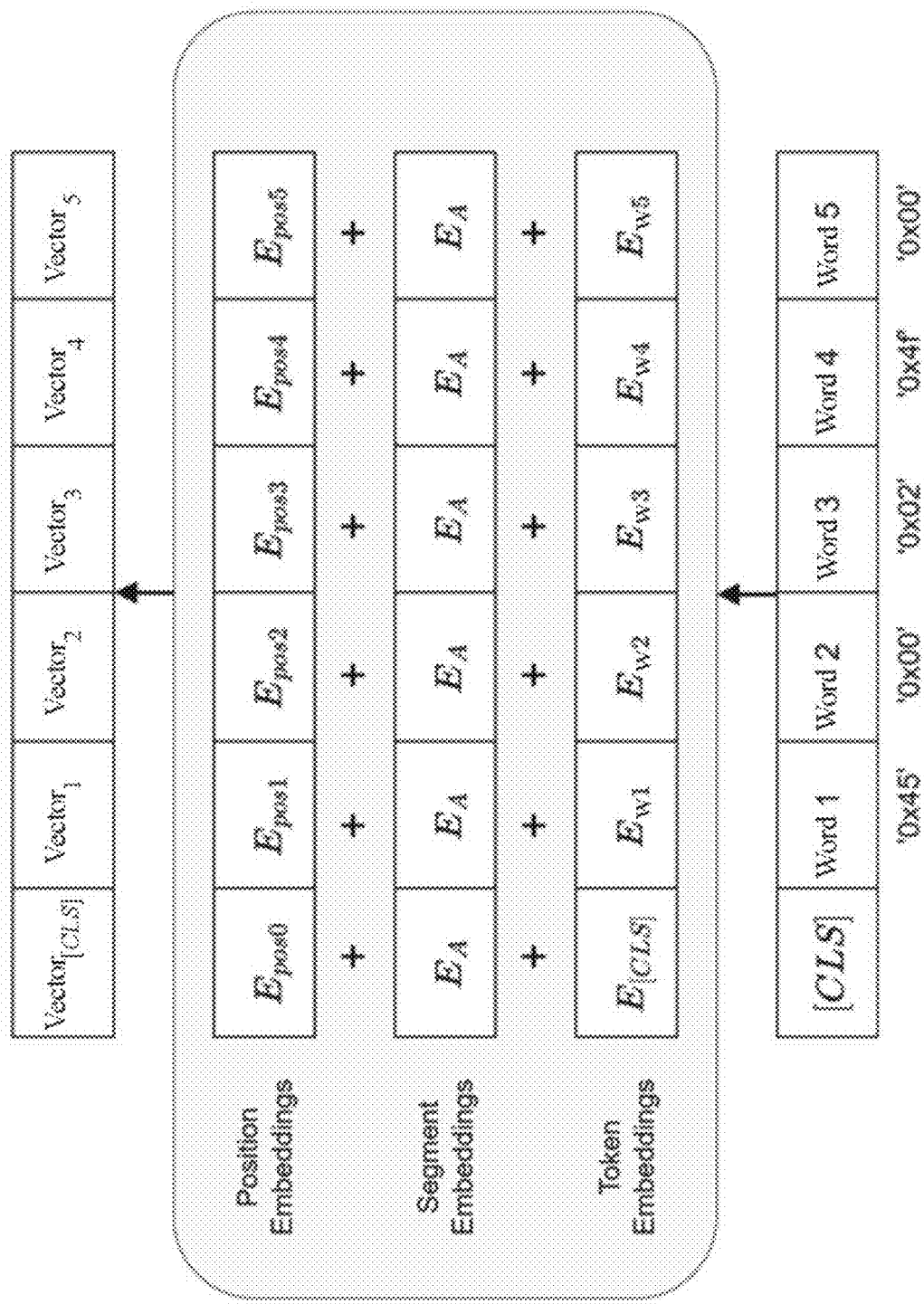
FIG. 4 is a structural diagram of an embedding layer of a BERT model according to the present disclosure.

S21: As shown in FIG. 4, the embedding layer is more specifically used to:

Take as input the output at step S1, i.e., the text representation of the byte sequence; take the byte sequence to be a text segment, and a byte to be a word, where a word vector has a dimension of 768; extract a token embedding, a segment embedding and a position embedding as representations for the word; and sum up the embeddings to obtain a 768-dimensional vector.

Figure 5:
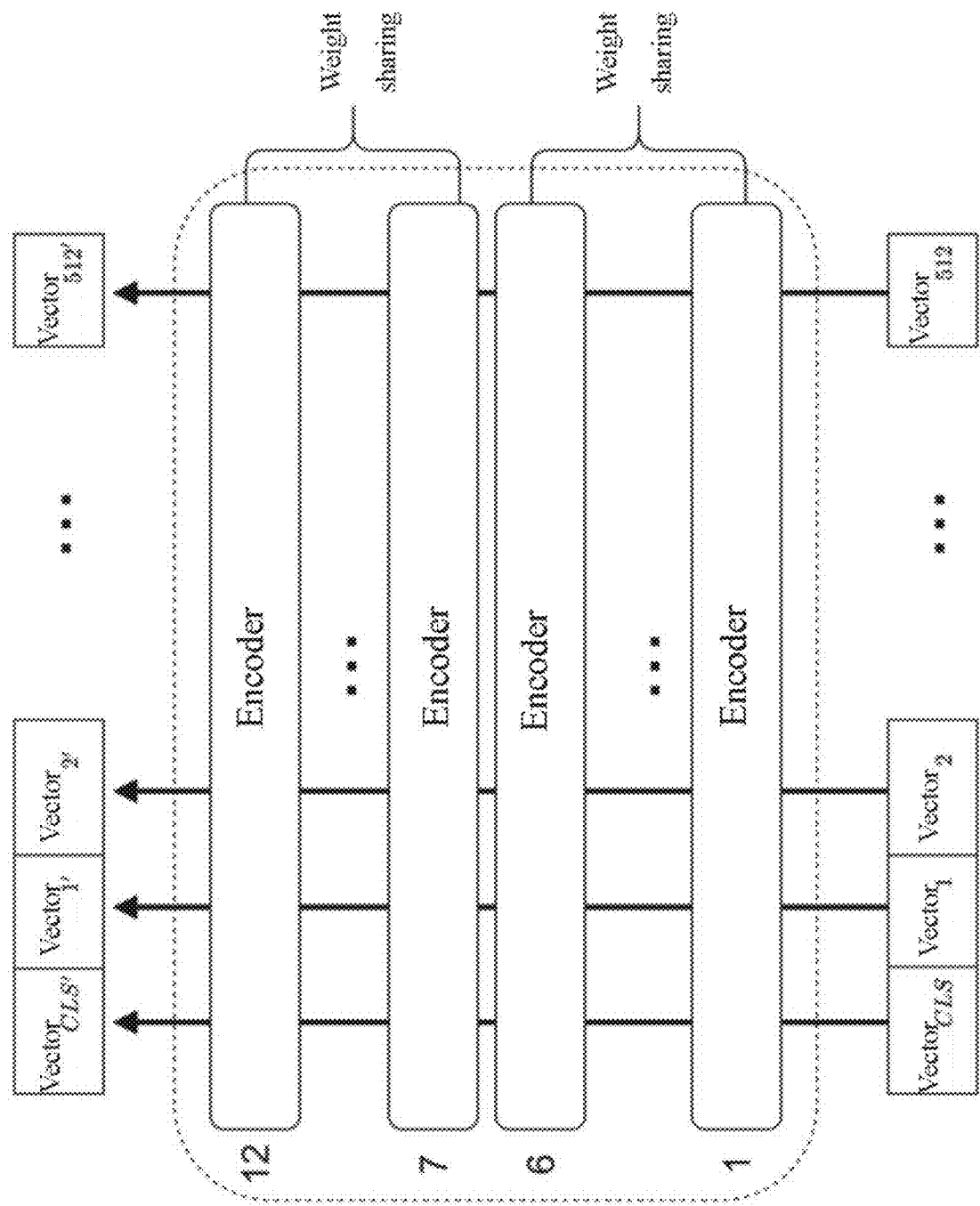
FIG. 5 is a structural diagram of an encoder network of a BERT model according to the present disclosure.

S22: As shown in FIG. 5, the BERT encoder network is more specifically used to:

Build an improved encoder network, with a first 6 encoders sharing a common set of parameters and a last 6 encoders sharing a common set of parameters. Pass the output at step S21 through all 12 encoders, with each encoder having an input and output dimension of 768; and obtain a 768-dimensional vector representation including traffic contextual feature information.

S3: Building a classification Network: Take as input the 768-dimensional [CLS] vector output by a last hidden layer at step S22, and pass the same through several fully connected layers and then a softmax layer.

S31: Fully connected layer: Take as input the feature vector output at step S22 as input, and pass the same through several fully connected layers to generate a numerical distribution list for traffic classification.

S32: Softmax layer: Perform softmax calculation on the numerical distribution list output at step S31 to convert the list into a probability distribution for traffic classification.

S4: Building an improved loss function: To integrate contrastive learning into fine-tune training of the model, use the improved loss function to cause network stream samples of a common class to be more similar in the embedding space, and network stream samples of different classes to be less similar, enhancing the model's generalization ability and robustness. The final total loss function Loss includes both a cross-entropy loss and a contrastive loss:

$$Loss = \lambda \cdot CELoss + (1-\lambda) \cdot SCLoss$$

where the $\lambda$ moderates the weights between the cross-entropy loss and the contrastive loss.

The cross-entropy loss CELoss function is denoted as:

$$CELoss = \sum_{(y,t)} -[(t \log y) + (1-t)\log(1-y)]$$

where the t denotes a real label of a network stream, the $\hat{y}$ denotes a probability result calculated by the softmax layer.

The contrastive loss SCLoss is denoted as:

$$SCLoss = \sum_{i \neq j} -y \cdot \log(\sigma(S(x_i, x_j)/\tau)) - (1-y) \cdot \log(1 - \sigma(S(x_i, x_j)/\tau))$$

where the $\sigma$ denotes a sigmoid function, the i and the j denote different network traffic samples from the same batch, the $x_i$ and $x_j$ respectively denote a 768-dimensional [CLS] vector output by the 10th layer encoder of the improved BERT model, the S denotes a function for measuring a similarity between the $x_i$ and $x_j$, the y denotes whether (0 or 1) the $x_i$ and $x_j$ belong to the same class, and $\tau$ is a hyperparameter.

S5: Model training assessing: The preprocessed data is divided into a training set, a validation set, and a test set, and the model is trained and assessed.

S51: Unsupervised model pre-training: Use massive traffic data to administer unsupervised pre-training to the BERT model.

S511: Masking: For a preprocessed byte sequence (of length 512), random select 15% of the bytes to apply masking. Of the randomly selected bytes, 10% have their inputs randomly replaced with another byte's input, 80% have their inputs replaced with the special token [MASK], and 10% have their inputs unchanged.

S512: Unsupervised training: Feed the masked packet sequence into the improved BERT model of S2; apply forward computation to obtain a probability distribution of the bytes at the masked positions; and use the cross-entropy loss function to calculate the difference between the model's predicted probability distribution and the real labels.

S513: Backpropagation: Update the parameters of the model through backpropagation, causing the loss to approach zero.

S514: Termination condition of the unsupervised training: Terminate the unsupervised pre-training when the loss has reached a preset level or the pre-training has reached a preset number of epochs, and keep the trained model parameters.

S52: Model fine-tune training: Fine-tune training the model using the improved BERT model and the loss function.

S521: Feed a preprocessed byte sequence (of length 512) into the improved BERT model; encode the features of the input sequence up to a 768-dimensional feature vector representation (of length 768*512) for all bytes.

S522: Pass the 768-dimensional [CLS] output vector from a 12th layer Transformer encoder network of the improved BERT model to the classification network to yield a probability distribution corresponding to a number of class labels.

S523: Forward computation: Use the improved loss function from step S4 to compute the loss of the model. Considering the special nature of the traffic task, the improved loss function incorporates the idea of contrastive learning into the cross-entropy loss CELoss by adding the contrastive loss SCLoss that calculates the contrastive loss based on the 768-dimensional [CLS] vector output by the 10th encoder network of the BERT model.

S524: Backpropagation: Iteratively update the model parameters by backpropagation (using an Adam optimizer), causing the SCLoss and the CELoss to diminish. As the SCLoss diminishes, network stream samples of a common class will become closer in the embedding space, while network stream samples of different classes will move further apart, effectively improving the robustness and accuracy of the model.

S525: Termination condition of the fine-tune training: Track the losses for the training set and the validation set; terminate the fine-tune training when the loss for the validation set has reached a preset level or the pre-training has reached a preset number of epochs, and keep the trained model.

S53: Model assessment: Assess the performance of the trained model using the test set. Freeze the parameters of the trained model; mirror the fine-tune training at step S52; and assess the performance of the trained model using accuracy, recall, precision, and F1_score. The formulas are as below:

$$Accuracy = \frac{TP + TN}{TP + TN + FP + FN}$$
$$Recall = \frac{TP}{TP + FN}$$
$$Precision = \frac{TP}{TP + FP}$$
$$F1\_score = \frac{2 \times Precison \times Recall}{Precison + Recall}$$

where the TP indicates the BERT model has correctly predicted an actual anomaly traffic to be anomalous, the TN indicates the BERT model has correctly predicted an actual normal traffic to be normal, the FP indicates the BERT model has erroneously predicted an actual normal traffic to be anomalous, and the FN indicates the BERT model has erroneously predicted an actual anomaly traffic to be normal.

S6: Obtain test traffic data; feed the test traffic data into the trained improved BERT model; and obtain a traffic detection outcome.

The present disclosure targets at traffic anomaly detection tasks and expanding the model's outreach. The BERT model is improved, resource consumption is reduced, and the model's generalization ability is enhanced. Meanwhile, an effective solution is proposed to rectify the insufficiencies of conventional RNNs, namely the lack of parallelism and accuracy deficiencies. Furthermore, the present disclosure incorporates the idea of contrastive learning, effectively improving the robustness and accuracy of the model.

Embodiment 2

This embodiment provides a traffic anomaly detection system based on improved BERT integrating contrastive learning to implement the method described in Embodiment 1. The system includes: a traffic data acquisition module, a data preprocessing module, an improved BERT model building module, a classification network building module, a total loss function building module, an unsupervised pre-training module, a fine-tune training module, and a traffic detection outcome outputting module.

In this embodiment, the traffic data acquisition module is used to acquire traffic data.

In this embodiment, the data preprocessing module is used to preprocess the traffic data to obtain a byte sequence.

In this embodiment, the improved BERT model building module is used to: build an improved BERT model including an embedding layer and 12 Transformer encoder networks, where the embedding layer takes the byte sequence to be a text segment, and a byte to be a word; extracting a token embedding, a segment embedding and a position embedding as representations for the word; sum up the token embedding, the segment embedding and the position embedding to obtain a corresponding vector; perform weight sharing operation among a first 6 Transformer encoder networks and a last 6 Transformer encoder networks, respectively; and the improved BERT model outputs, for the byte, a vector representation including traffic contextual feature information.

In this embodiment, the classification network building module is used to build a classification network.

In this embodiment, the total loss function building module is used to build a total loss function based on a cross-entropy loss and a contrastive loss.

In this embodiment, the unsupervised pre-training module is used to: apply masking to the byte sequence and feed a masked byte sequence into the improved BERT model for unsupervised pre-training; calculate a probability distribution of a byte at a masked position using forward computation; and calculate a difference between a predicted probability distribution and a real label based on the cross-entropy loss function.

In this embodiment, the fine-tune training module is used to: transfer an output vector from a 12th layer Transformer encoder network of the improved BERT model to the classification network; the classification network outputs a probability distribution corresponding to a number of class labels; and calculates the contrastive loss using an output vector of a 10th layer Transformer encoder network of the improved BERT model; and updates a model parameter through backpropagation to obtain a trained improved BERT model;

in this embodiment, the traffic detection outcome outputting module is used to: feed test traffic data into the trained improved BERT model; and obtain a traffic detection outcome.

In this embodiment, when the data preprocessing module is used to preprocess the traffic data to obtain a byte sequence, the data preprocessing module is more specifically used to perform: data splitting, vocabulary expanding, data cleaning, and unifying data length, where:

the data splitting includes splitting an original traffic data set into data stream sets using a network session as a splitting criterion, where a data stream is a sequence of multiple data packets, where a data packet in the data stream includes a five-tuple: {source IP, destination IP, source port, destination port, network protocol}, and is arranged according to a temporal order, and the data packet is a sequence of multiple bytes, the vocabulary expanding includes adding new words to a BERT vocabulary, the data cleaning includes removing information that does not meet a specified condition.

In this embodiment, the unifying data length includes a step of unifying data stream length and a step of unifying data packet length.

In this embodiment, the classification network includes several fully connected layers and a softmax layer;

the several fully connected layers converts the vector representation outputted from the improved BERT model into a numerical distribution list for traffic classification; and the softmax layer performs softmax calculation on the numerical distribution list to convert the list into a probability distribution for traffic classification.

In this embodiment, the total loss function building module is used to build a total loss function based on a cross-entropy loss and a contrastive loss, where the total loss function is denoted as:

$$Loss = \lambda \cdot CELoss + (1 - \lambda) \cdot SCLoss$$

$$CELoss = \sum_{(y,t)} -[(t \log y) + (1 - t)\log(1 - y)]$$

$$SCLoss = \sum_{i \neq j} -y \cdot \log(\sigma(S(x_i, x_j)/\tau)) - (1 - y) \cdot \log(1 - \sigma(S(x_i, x_j)/\tau))$$

where the CELoss denotes the cross-entropy loss, the SCLoss denotes contrastive loss, the $\lambda$ is used to control weights between the cross-entropy loss and the contrastive loss, the t denotes a real label of a network stream, the y denotes a probability result calculated by the softmax layer, the $\sigma$ denotes a sigmoid function, the i and the j denote different network traffic samples from the same batch, the $x_i$ and $x_j$ respectively denote the [CLS] vectors output by the 10th layer encoder of the improved BERT model, the S denotes a function for measuring a similarity between the $x_i$ and $x_j$, the y indicates whether the $x_i$ and $x_j$ belong to the same class, and $\tau$ is a hyperparameter.

In this embodiment, the system further includes a model assessing module used to assess a performance of the BERT model according to accuracy, recall, precision, and F1 score, denoted by:

$$Accuracy = \frac{TP + TN}{TP + TN + FP + FN}$$

$$Recall = \frac{TP}{TP + FN}$$

$$Precision = \frac{TP}{TP + FP}$$

$$F1\_score = \frac{2 \times Precison \times Recall}{Precison + Recall}$$

where the Accuracy denotes the accuracy, the Recall denotes the recall, the Precision denotes the precision, the F1_score denotes the F1 score, the TP indicates the BERT model has correctly predicted an actual anomaly traffic to be anomalous, the TN indicates the BERT model has correctly predicted an actual normal traffic to be normal, the FP indicates the BERT model has erroneously predicted an actual normal traffic to be anomalous, the FN indicates the BERT model has erroneously predicted an actual anomaly traffic to be normal.

The above embodiments are preferred embodiments of the present disclosure, but the embodiments of the present disclosure are not limited thereto. Any changes, modifications, substitutions, combinations, simplifications that do not depart from the spirit and principles of the present disclosure should be considered equivalent alternatives and are deemed within the scope of protection of the present disclosure.

What is claimed is:

1. A traffic anomaly detection method based on improved Bidirectional Encoder Representations from Transformers, BERT integrating contrastive learning, comprising the following steps:

obtaining traffic data and preprocessing the traffic data to obtain a byte sequence;

building an improved BERT model comprising an embedding layer and 12 Transformer encoder networks, wherein the byte sequence is fed into the embedding layer, and is taken to be a text segment, and a byte is taken to be a word; extracting a token embedding, a segment embedding and a position embedding as representations for the word; summing up the token embedding, the segment embedding and the position embedding to obtain a corresponding vector; performing weight sharing operation among a first 6 Transformer encoder networks and a last 6 Transformer encoder networks, respectively; and outputting, by the improved BERT model and for the byte, a vector representation comprising traffic contextual feature information;

building a classification network;

building a total loss function based on a cross-entropy loss and a contrastive loss, and it comprises:

$$Loss = \lambda \cdot CELoss + (1 - \lambda) \cdot SCLoss$$

$$CELoss = \sum_{(y,t)} -[(t \log y) + (1 - t)\log(1 - y)]$$

$$SCLoss = \sum_{i \neq j} -y \cdot \log(\sigma(S(x_i, x_j)/\tau)) - (1 - y) \cdot \log(1 - \sigma(S(x_i, x_j)/\tau))$$

wherein the CELoss denotes the cross-entropy loss, the SCLoss denotes contrastive loss, the $\lambda$ is used to control weights between the cross-entropy loss and the contrastive loss, the t denotes a real label of a network stream, the y denotes a probability result calculated by a softmax layer, the $\sigma$ denotes a sigmoid function, the i and the j denote different network traffic samples from a same batch, the $x_i$ and $x_j$ each denotes a vector output by a $10^{th}$ layer encoder of the improved BERT model, the S denotes a function for measuring a similarity between the $x_i$ and $x_j$, the y indicates whether the $x_i$ and $x_j$ belong to a same class, and $\tau$ is a hyperparameter;

applying masking to the byte sequence and feeding a masked byte sequence into the improved BERT model for unsupervised pre-training; calculating a probability distribution of a byte at a masked position using forward computation; and calculating a difference between a predicted probability distribution and a real label based on the cross-entropy loss function;

passing an output vector from a $12^{th}$ layer Transformer encoder network of the improved BERT model to the classification network; outputting, by the classification network, a probability distribution corresponding to a number of class labels; and calculating the contrastive loss using an output vector of the $10^{th}$ layer encoder network of the improved BERT model;

updating a model parameter through backpropagation to obtain a trained improved BERT model;

obtaining test traffic data; feeding the test traffic data into the trained improved BERT model; and obtaining a traffic detection outcome.

2. The method according to claim 1, wherein the preprocessing the traffic data comprises data splitting, vocabulary expanding, data cleaning, and unifying data length, wherein the data splitting comprises splitting an original traffic data set into data stream sets using a network session as a splitting criterion, wherein a data stream is a sequence of multiple data packets, wherein a data packet in the data stream comprises a five-tuple: {source IP, destination IP, source port, destination port, network protocol}, and is arranged according to a temporal order, and the data packet is a sequence of multiple bytes, the vocabulary expanding comprises adding new words to a BERT vocabulary, the data cleaning comprises removing information that does not meet a specified condition, and the unifying data length comprises a step of unifying data stream length and a step of unifying data packet length.

3. The method according to claim 1, wherein the classification network comprises several fully connected layers and the softmax layer, the vector representation outputted from the improved BERT model is fed into the classification network and through the several fully connected layers to generate a numerical distribution list for traffic classification, the softmax layer performs softmax calculation on the numerical distribution list to convert the list into a probability distribution for traffic classification.

4. The method according to claim 1, wherein following the trained improved BERT model is obtained, the method further comprises: assessing a performance of the BERT model according to accuracy, recall, precision, and F1 score, denoted by:

$$Accuracy = \frac{TP+TN}{TP+TN+FP+FN}$$

$$Recall = \frac{TP}{TP+FN}$$

$$Precision = \frac{TP}{TP+FP}$$

$$F1\_score = \frac{2 \times Precison \times Recall}{Precison + Recall}$$

wherein the Accuracy denotes the accuracy, the Recall denotes the recall, the Precision denotes the precision, the F1_score denotes the F1 score, the TP indicates the BERT model has correctly predicted an actual anomaly traffic to be anomalous, the TN indicates the BERT model has correctly predicted an actual normal traffic to be normal, the FP indicates the BERT model has erroneously predicted an actual normal traffic to be anomalous, the FN indicates the BERT model has erroneously predicted an actual anomaly traffic to be normal.

* * * * *